B. F. BLANCHARD.
FISHING TOOL.
APPLICATION FILED FEB. 10, 1914.
1,130,881.
Patented Mar. 9, 1915.
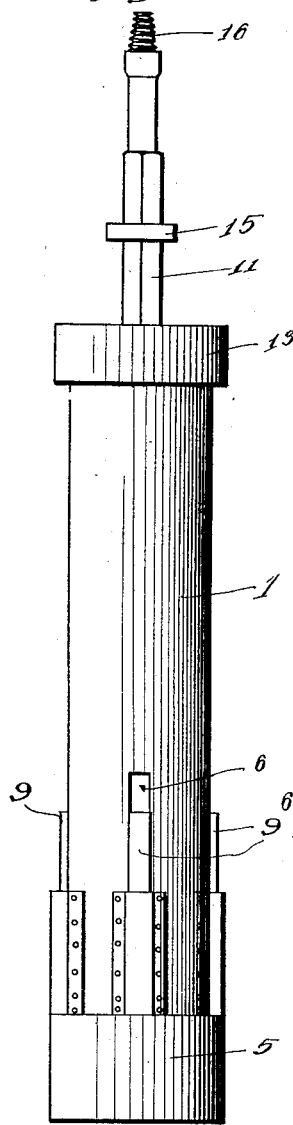
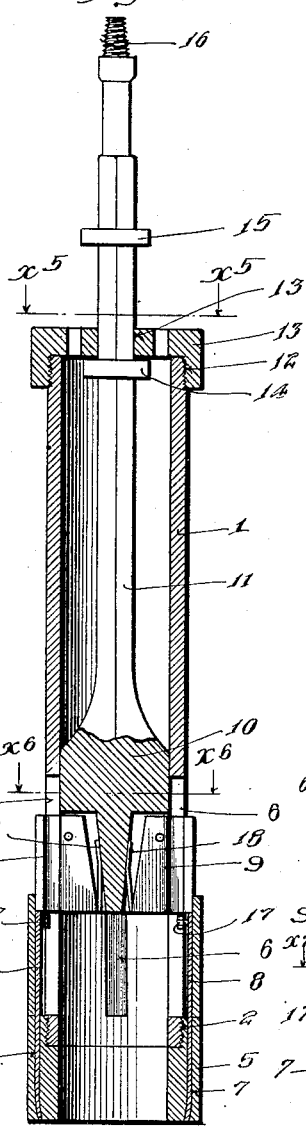
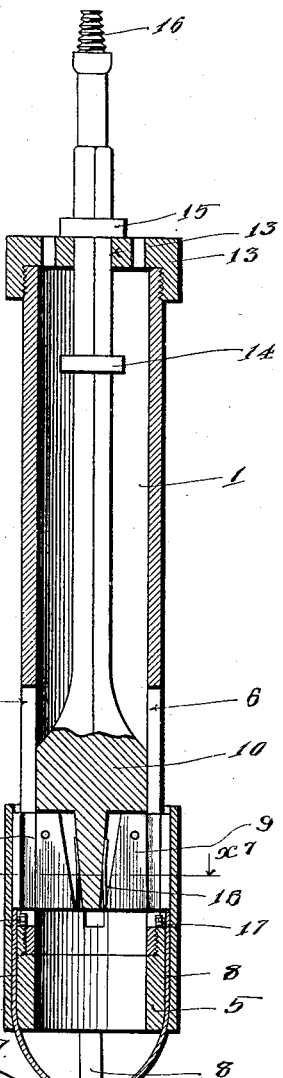
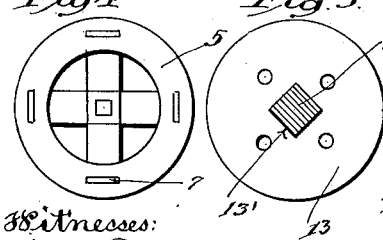
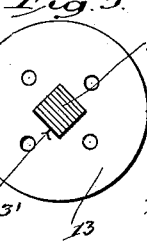
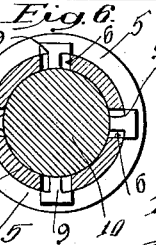
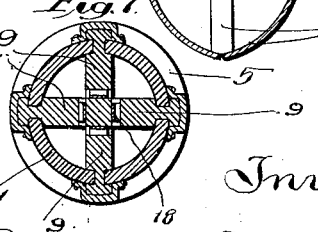
Inventor
Benjamin F. Blanchard

UNITED STATES PATENT OFFICE.

BENJAMIN FRANKLIN BLANCHARD, OF FULLERTON, CALIFORNIA.

FISHING-TOOL.

1,130,881.      Specification of Letters Patent.      Patented Mar. 9, 1915.

Application filed February 10, 1914. Serial No. 817,803.

*To all whom it may concern:*

Be it known that I, BENJAMIN F. BLANCHARD, a citizen of the United States, residing at Fullerton, in the county of Orange and State of California, have invented a new and useful Fishing-Tool, of which the following is a specification.

This invention relates to a fishing tool designed for use in oil wells to recover lost tools, and the main object of the invention is to provide a fishing tool which can be used in recovering small articles. A thing which frequently has to be fished for is a lug from an underreamer. These lugs are small, of an irregular shape, and are very difficult to recover by the use of the ordinary fishing tools, and the present invention is especially adapted for recovering underreamer lugs or similar articles, and is so constructed that when it is lowered and strikes the underreamer lug or similar article, it causes certain fingers hereinafter described to be projected downwardly and around the sides of the lug in such a manner that the fingers clasp the lug and lift the lug with the fishing tool, when the latter is lifted.

Referring to the drawings: Figure 1 is a side elevation of the tool. Fig. 2 is a vertical section thereof. Fig. 3 is a view similar to Fig. 2, showing the position of the parts with the gripping fingers projected. Fig. 4 is an inverted view thereof. Fig. 5 is a cross section on line $x^5$—$x^5$, in Fig. 2. Fig. 6 is a cross section on line $x^6$—$x^6$, Fig. 2. Fig. 7 is a cross section on line $x^7$—$x^7$, Fig. 3.

The tool comprises a barrel 1, having a lower threaded end 2, to which is screwed an extension 5. The barrel 1 is formed with a series of grooves 6, and the extension 5 is provided with a series of slots 7, the upper ends of which register with the grooves 6 and at the lower ends are curved inwardly, as clearly shown in Figs. 2 and 3. Slidably arranged in the slots 7 are fingers 8, which may be made of iron or soft annealed steel which project up into the grooves 6 when they are retracted, as shown in Fig. 2. These fingers when in normal position do not project below the lower end of the extension 5. Slidably engaging in the slots 6 are slips 9, the lower ends of which are adapted to bear against the upper ends of the fingers 8. The slips 9 are pivotally secured to a head 10 on the lower end of a stem 11 which is slidable in the barrel 1. the upper end of the barrel 1 being threaded at 12 to receive a cap 13 having a central square opening 13′. The upper end of the stem 11 is provided with two flanges 14 and 15, which respectively limit the up and down movement of the head 10 and slips 9 with respect to the barrel 1. The stem 11 is threaded at 16 for the attachment of the socket of a line not shown.

In operation the fingers 8 are retracted as shown in Fig. 2 and the fishing tool is lowered into the hole, the cap 13 resting on the flange 14. When the lower end of the extension 5 strikes the lost article, farther downward motion of the extension 5 is arrested, and the shank 1 thus remains stationary while the stem 11 and head 10 continue to descend, and as the slips 9 bear against the upper ends of the finger 8 the slips push down the fingers, and as the fingers are thus projected, the curvature of the slots 7 causes the fingers to curve inwardly as they protrude around the outer edge of the lost article and grip under the same so that the article is not only embraced by the fingers, but the fingers also extend underneath the object sufficiently to surely engage it. Upon lifting the stem 11, the latter rises until the flange 14 strikes the cap 13 whereupon it lifts the barrel 3 and extension 5, and the fingers raise the object which is in their grasp. The fingers have set screws 17 at their upper ends to strike the bottom wall of slots of extension 5 and prevent them from being pulled out of the extension 5. Springs 18 are arranged back of the slips 9 to keep their lower ends pressed outwardly into close engagement with the bottoms of the grooves 6 to insure their engagement with the fingers 8.

What I claim is:—

1. A fishing tool comprising a shank, a barrel secured to the lower end of the shank and provided with slots, an extension on said barrel provided with slots which register with the slots in the barrel, slips sliding in the slots in the barrel, fingers slidable in the slots in the extension and projecting into the slots in the barrel adapted to be engaged by the slips, a head slidable in the barrel carrying said slips, and a stem on the head projecting up through the shank.

2. A fishing tool comprising a shank with a threaded lower end, a barrel screwed to the lower end, a stem sliding in the shank, a head on the lower end of the shank slidable in the barrel, said barrel having a plurality of slots, slips slidable in said slots and pivotally engaging said head, an extension screwed to the barrel and provided with longitudinal slots which register with the slots in the barrel, the slots in the extension converging toward their lower ends, and fingers slidable in the slots in the extension and projecting into the slots in the barrel to be engaged by the downward movement of said slips.

3. A fishing tool comprising a barrel with a threaded lower end, an extension screwed to said lower end, a head on the lower end of the shank slidable in the barrel, said barrel having a plurality of slots, slips slidable in said slots and pivotally engaging said head, an extension screwed to the barrel and provided with longitudinal slots which register with the slots in the barrel, the slots in the extension converging toward their lower ends, fingers slidable in the slots in the extension and projecting into the slots in the barrel to be engaged by the downward movement of said slips, and springs between the head and slips for pressing the slips outward to engage said fingers.

In testimony whereof, I have hereunto set my hand at Los Angeles California this 5th day of February, 1914.

BENJAMIN FRANKLIN BLANCHARD.

In presence of—
GEO. T. HACKLEY,
LORRAINE E. DURROW.

Copies of this patent may be obtained for five cents each, by addressing the "Commissioner of Patents, Washington, D. C."